United States Patent [19]
Stander et al.

[11] Patent Number: 6,035,632
[45] Date of Patent: Mar. 14, 2000

[54] STEP RESPONSE CATALYST MONITORING

[75] Inventors: Douglas M. Stander, Grosse Pt. Woods, Mich.; Andrew C. Bartlett, Westborough, Mass.

[73] Assignee: Chrysler Corporation, Auburn Hills, Mich.

[21] Appl. No.: 09/135,759

[22] Filed: Aug. 18, 1998

[51] Int. Cl.$^7$ .................................................. F01N 3/00
[52] U.S. Cl. .............................. 60/274; 60/277; 60/276; 60/285; 123/481; 123/198 F
[58] Field of Search .............................. 60/274, 276, 277, 60/285; 123/481, 198 F, 198 DB

[56] References Cited

U.S. PATENT DOCUMENTS

| | | |
|---|---|---|
| 3,969,932 | 7/1976 | Rieger et al. . |
| 4,542,728 | 9/1985 | Otobe et al. ............................ 123/440 |
| 5,127,225 | 7/1992 | Nada ........................................ 60/274 |
| 5,228,286 | 7/1993 | Demura .................................... 60/276 |
| 5,335,538 | 8/1994 | Blischke et al. . |
| 5,633,456 | 5/1997 | Stander et al. . |
| 5,732,553 | 3/1998 | Mitsutani ................................. 60/276 |
| 5,851,376 | 12/1998 | Nishioka et al. ........................ 60/277 |

*Primary Examiner*—Thomas Denion
*Assistant Examiner*—Binh Tran
*Attorney, Agent, or Firm*—Mark P. Calcaterra

[57] ABSTRACT

A method is provided for monitoring catalyst efficiency in a catalytic converter of a motor vehicle, comprising the steps of: (a) detecting an oxygen level of an exhaust gas from the vehicle's engine by using an oxygen sensor positioned at the outlet of the catalytic converter; (b) terminating fuel flow to the vehicle's engine; (c) detecting a change in the oxygen level in response to terminating fuel flow; (d) determining a time period from termination of fuel flow to detection of the change in oxygen level; and then (e) compensating this time period with respect to an exhaust flowrate, such that the compensated time period is indicative of catalyst efficiency of the catalytic converter. More specifically, the exhaust flowrate is determined from a manifold absolute pressure and an engine rotational speed of the engine. To achieve reliable and consistent results, catalyst monitoring of the present invention is only enabled under preferred vehicle operating conditions. In addition, catalyst monitoring may also determine a second measurement of the catalyst by determining a similar time period for catalyst response once the fuel flow returns to the engine.

19 Claims, 12 Drawing Sheets

STEP RESPONSE CATALYST MONITORING

BACKGROUND OF THE INVENTION

1. Field of the Invention

The present invention relates generally to catalyst monitoring in a motor vehicle and, more particularly, to a method and apparatus for monitoring catalyst efficiency in a catalytic converter, such that step response characteristics of the catalyst as measured by an oxygen sensor linearly correlate to catalyst efficiency.

2. Discussion

Catalytic converters are used to reduce major air pollutants, such as hydrocarbons (HC), carbon monoxide (CO) and oxides of nitrogen ($NO_x$), contained in the exhaust gas from an internal combustion engine of a motor vehicle. Each converter contains catalysts that produce a heated chemical reaction that transforms noxious pollutants into less harmful carbon dioxide (CO2) and water ($H_2O$) vapors. A catalytic converter is integrated downstream from the vehicle's engine into the vehicle's exhaust system. The effectiveness of reducing pollutants by a catalytic converter is highly dependent on the temperature and total gas throughput which, in turn, depends on the operational states and conditions of the internal combustion engine. Over time, catalyst efficiency degrades and thus decreases the capacity of the converter to convert toxic material. Government environmental regulations require continued reductions in vehicle emissions as well as accurate monitoring of various components of the emissions system.

Therefore, it would be desirable to provide a repeatable and robust method of monitoring catalyst efficiency in a catalytic converter. Catalyst monitoring should be performed with minimal processing requirements and no additional sensors or circuitry other than that provided by a typical motor vehicle. In addition, it should provide a less intrusive means of monitoring catalyst efficiency such that the algorithm output linearly correlates to the catalyst efficiency as measured by an oxygen sensor.

SUMMARY OF THE INVENTION

In accordance with the teachings of the present invention, a method is provided for monitoring catalyst efficiency in a catalytic converter of a motor vehicle, comprising the steps of: (a) detecting an oxygen level of an exhaust gas from the vehicle's engine by using an oxygen sensor positioned at the outlet of the catalytic converter; (b) terminating fuel flow to the vehicle's engine; (c) detecting a change in the oxygen level in response to terminating fuel flow; (d) determining a time period from termination of fuel flow to detection of the change in oxygen level; and then (e) compensating with respect to the exhaust flowrate during this time period, such that the compensated output is indicative of catalyst efficiency of the catalytic converter. More specifically, the exhaust flowrate is determined from a manifold absolute pressure and an engine rotational speed of the engine. To achieve reliable and consistent results, catalyst monitoring of the present invention is only enabled under preferred vehicle operating conditions. In addition, catalyst monitoring may also determine a second measurement of the catalyst by determining a similar time period for catalyst response once the fuel flow returns to the engine.

BRIEF DESCRIPTION OF THE DRAWINGS

Additional benefits and advantages of the present invention will become apparent to those skilled in the art to which this invention relates from a reading of the subsequent description of the preferred embodiment and the appended claims, taken in conjunction with the accompanying drawings:

DETAILED DESCRIPTION OF THE PREFERRED EMBODIMENT

Figure 1:
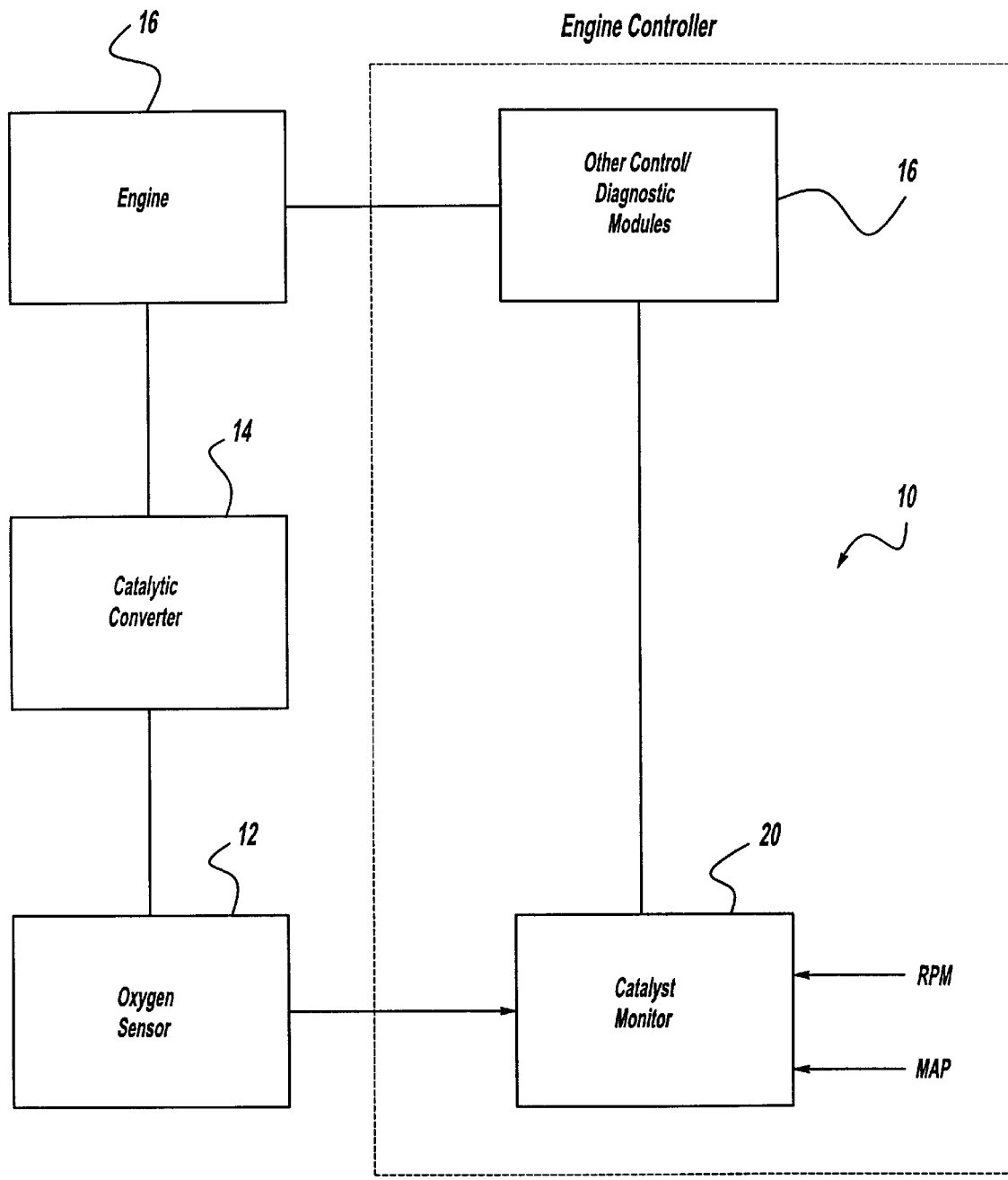
FIG. 1 is a block diagram showing the basic components of a catalyst monitoring system in accordance with the present invention.

The basic components of a catalyst monitoring system 10 are depicted in FIG. 1. Catalyst monitoring system 10 is generally comprised from an oxygen sensor 12 placed in the exhaust gas from an outlet of a catalytic converter 14 which is in turn positioned downstream from an internal combustion engine 16 of a motor vehicle. Oxygen sensor 12 is a linear or nonlinear device for detecting oxygen in exhaust gas as is well known in the art.

In accordance with the present invention, a method for monitoring catalyst efficiency in catalytic converter 14 is implemented in catalyst monitor 20. Catalyst monitor 20 is a semi-intrusive monitor that may be executed in the background loop of engine control software embedded on a typical microcontroller. Since monitoring need only occur once per trip for a relatively short time period (approximately 2 seconds), additional processing requirements on existing engine microcontrollers is minimal. Catalyst monitor 20 also interfaces with other engine control modules 18 to monitor and control vehicle operating conditions (i.e., fuel flow), and can be used in conjunction with other known catalyst monitoring techniques.

Catalyst monitor 20 receives (from oxygen sensor 12) an electrical signal that is indicative of the oxygen content at the outlet of catalytic converter 14. Changes in vehicle operating conditions can cause fluxuations in exhaust oxygen levels. For instance, a controlled "step like" termination of fuel flow into the vehicle's engine will in turn cause a step response change in exhaust oxygen levels. Catalyst monitoring of the present invention is based on detecting variations in this step response characteristic of the catalyst as measured by oxygen sensor 12.

Figure 2A:
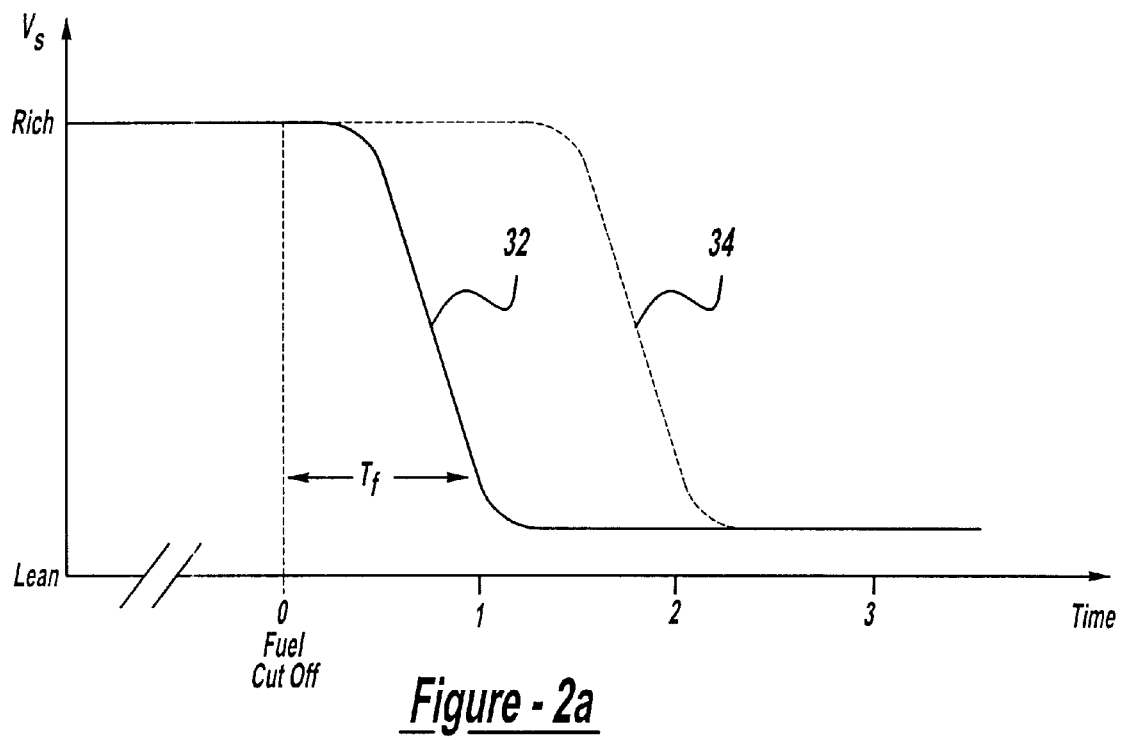
FIGS. 2A and 2B are diagrams illustrating step response characteristics of catalysts during a controlled fuel shut off condition in accordance with the present invention.

During vehicle operating conditions, a stoichiometric air/fuel ratio is ideally maintained. Under these operating conditions, the exhaust gas exhibits a "rich" exhaust condition as detected by oxygen sensor 12. When fuel flow is shut off from the engine, only oxygen is being drawn into the vehicle's engine. In response, the amount of oxygen abruptly increases in the exhaust gas (referred to as a "lean" exhaust condition) as shown by the step response change in FIG. 2A. In other words, at some switch time (Tf) this change in vehicle operating conditions causes a corresponding change in the amount of oxygen at the outlet of the catalytic converter. Because the oxygen storage capacity of the catalytic converter decreases as the catalyst degrades, catalyst efficiency will be reflected in variations in switch time (Tf). As a result, a good catalyst 34 having a relatively large oxygen storage capacity will exhibit a longer switching time (Tf) as compared to a bad catalyst 32.

Figure 2B:
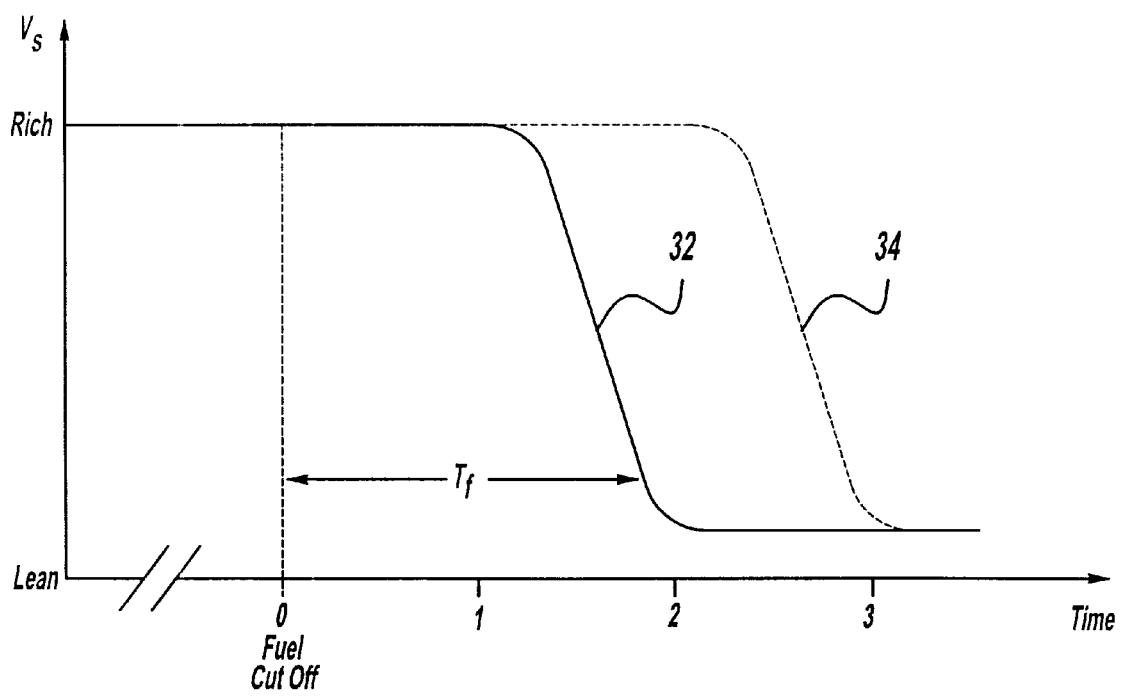

To correlate switching time (Tf) to catalyst efficiency, exhaust flowrate should also be factored into the catalyst monitoring of the present invention. As exhaust flowrate decreases, switching time (Tf) increases. In FIG. 2B, bad catalyst 32 and good catalyst 34 each have an increased switching time (Tf) when catalyst monitoring was performed during decreased exhaust flowrate conditions.

Figure 3A:
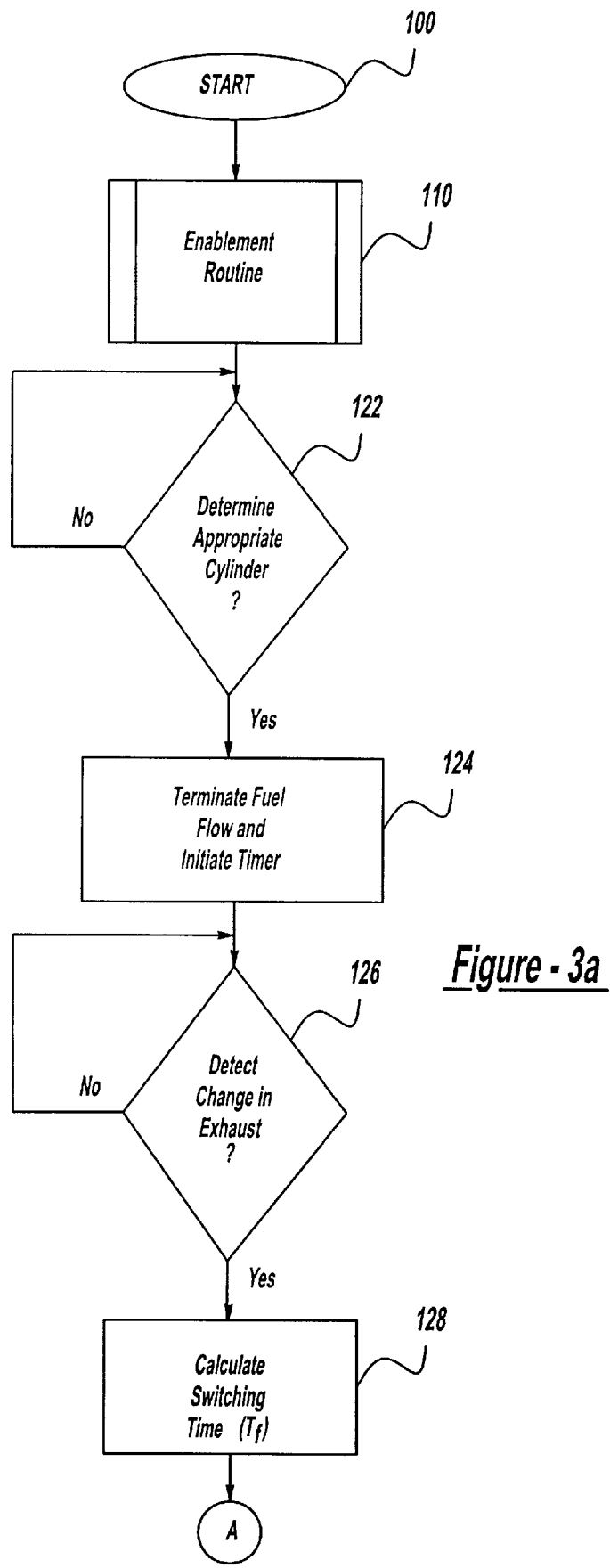
FIGS. 3A–3C are flowcharts showing the steps for catalyst monitoring in a preferred embodiment of a catalyst monitor module of the present invention.
Figure 3B:
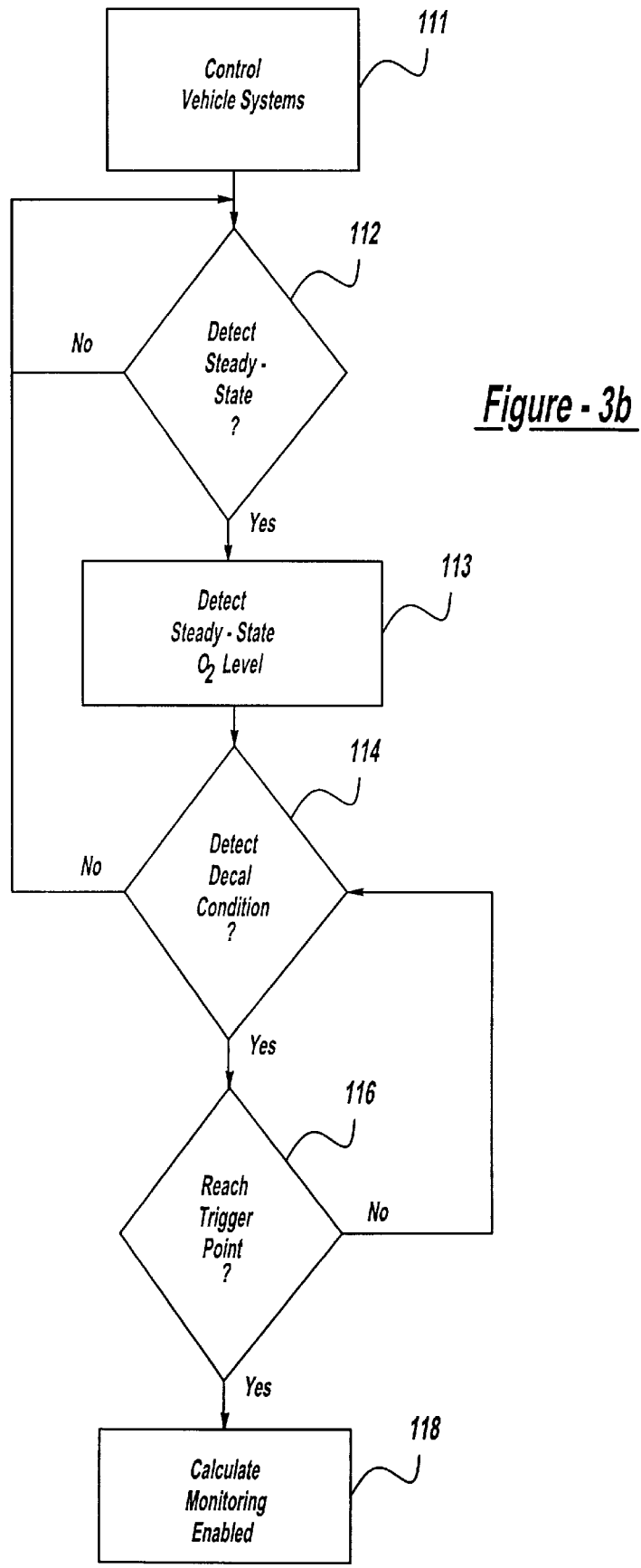
Figure 3C:
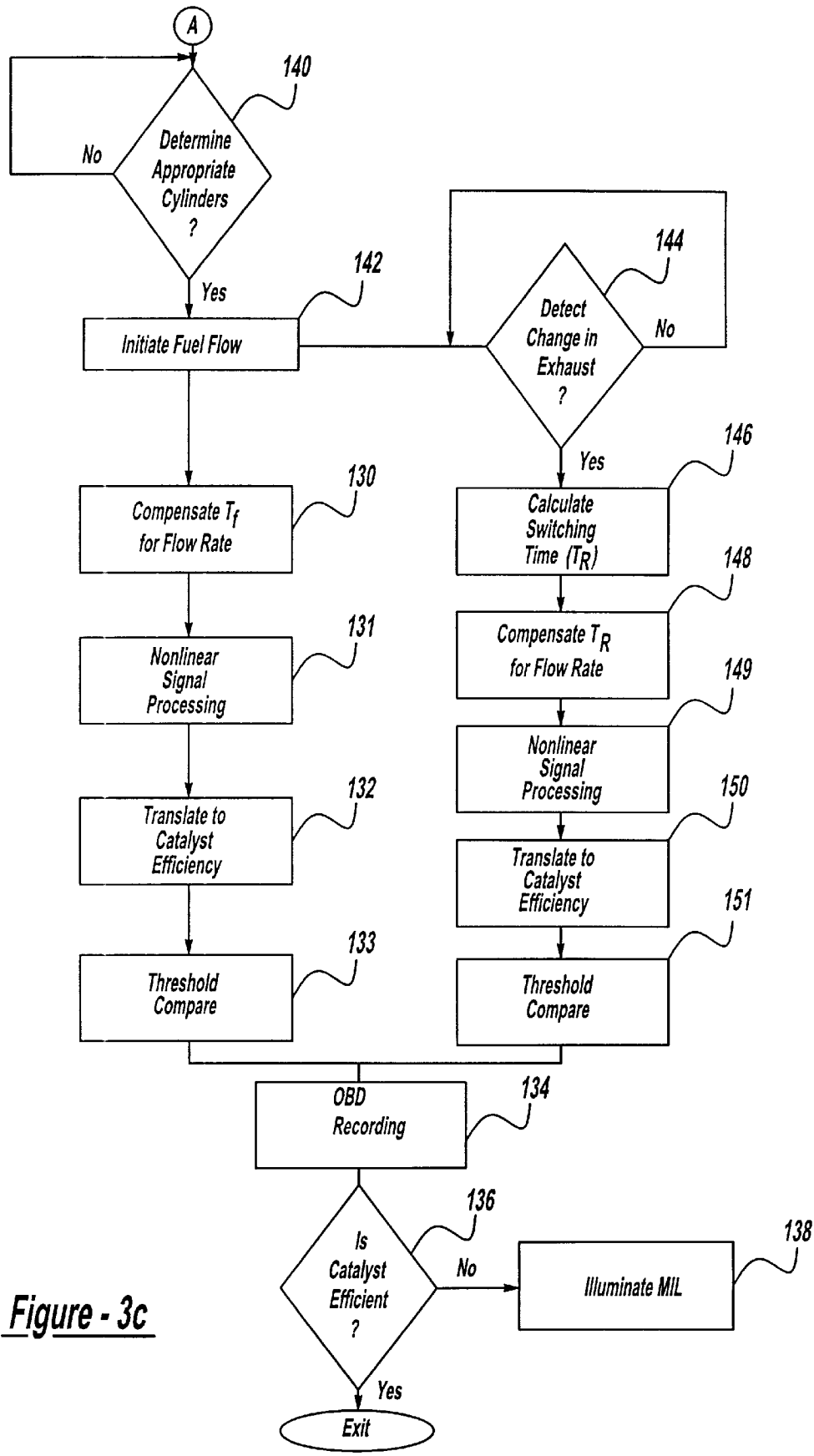
Figure 4A:
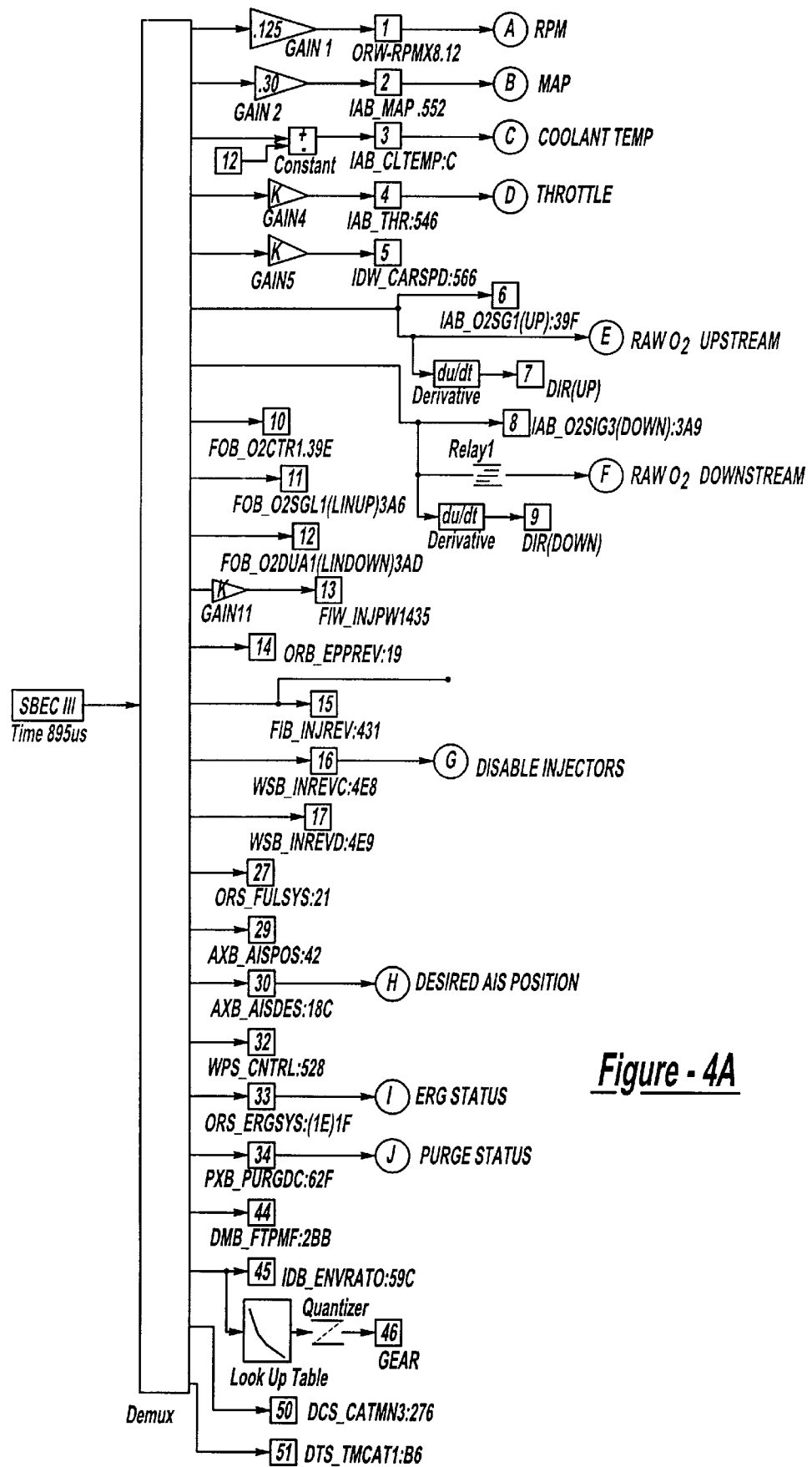
FIGS. 4A–4D are schematics showing a software implementation of the catalyst monitor of the present invention.
Figure 4B:
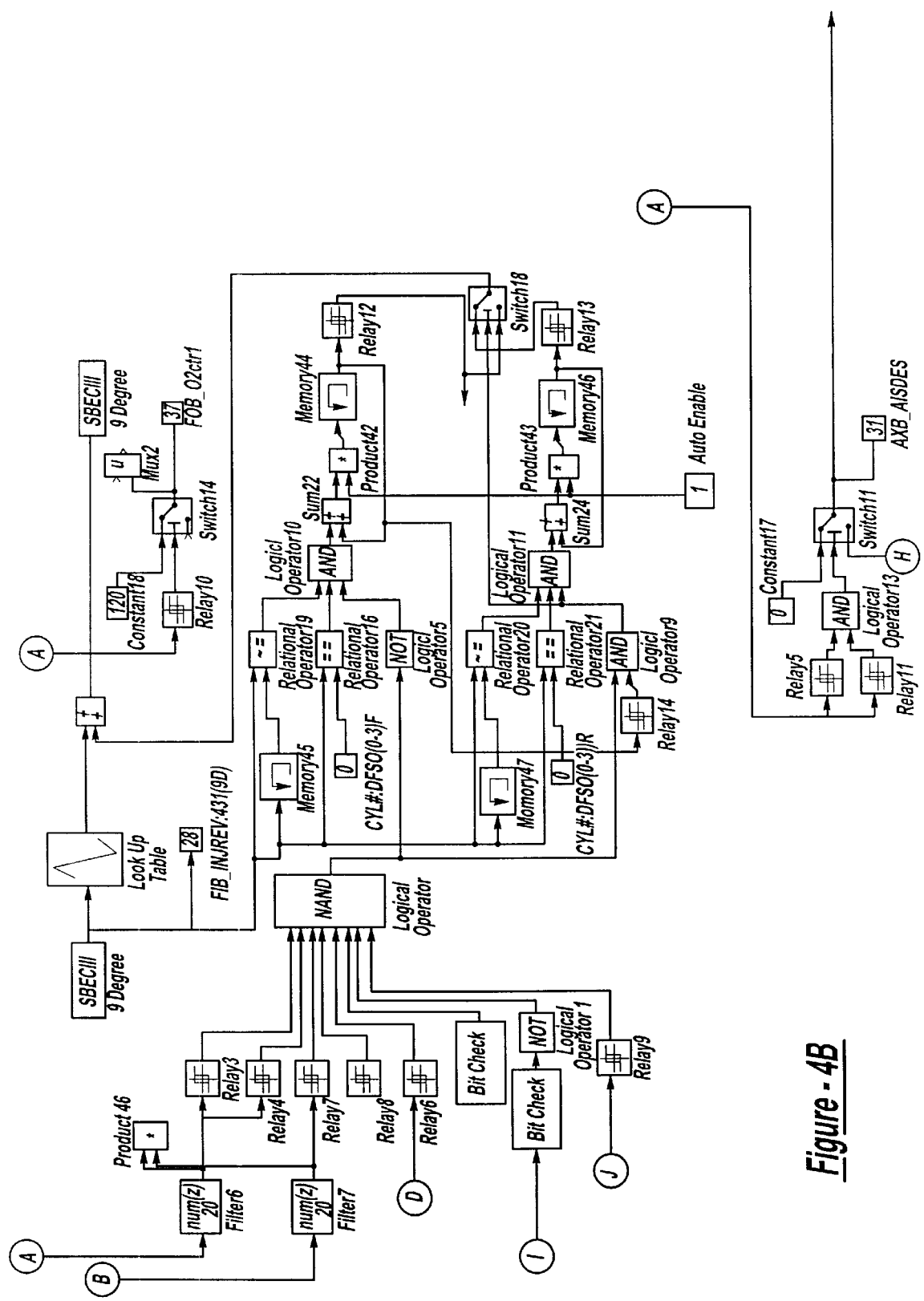
Figure 4C:
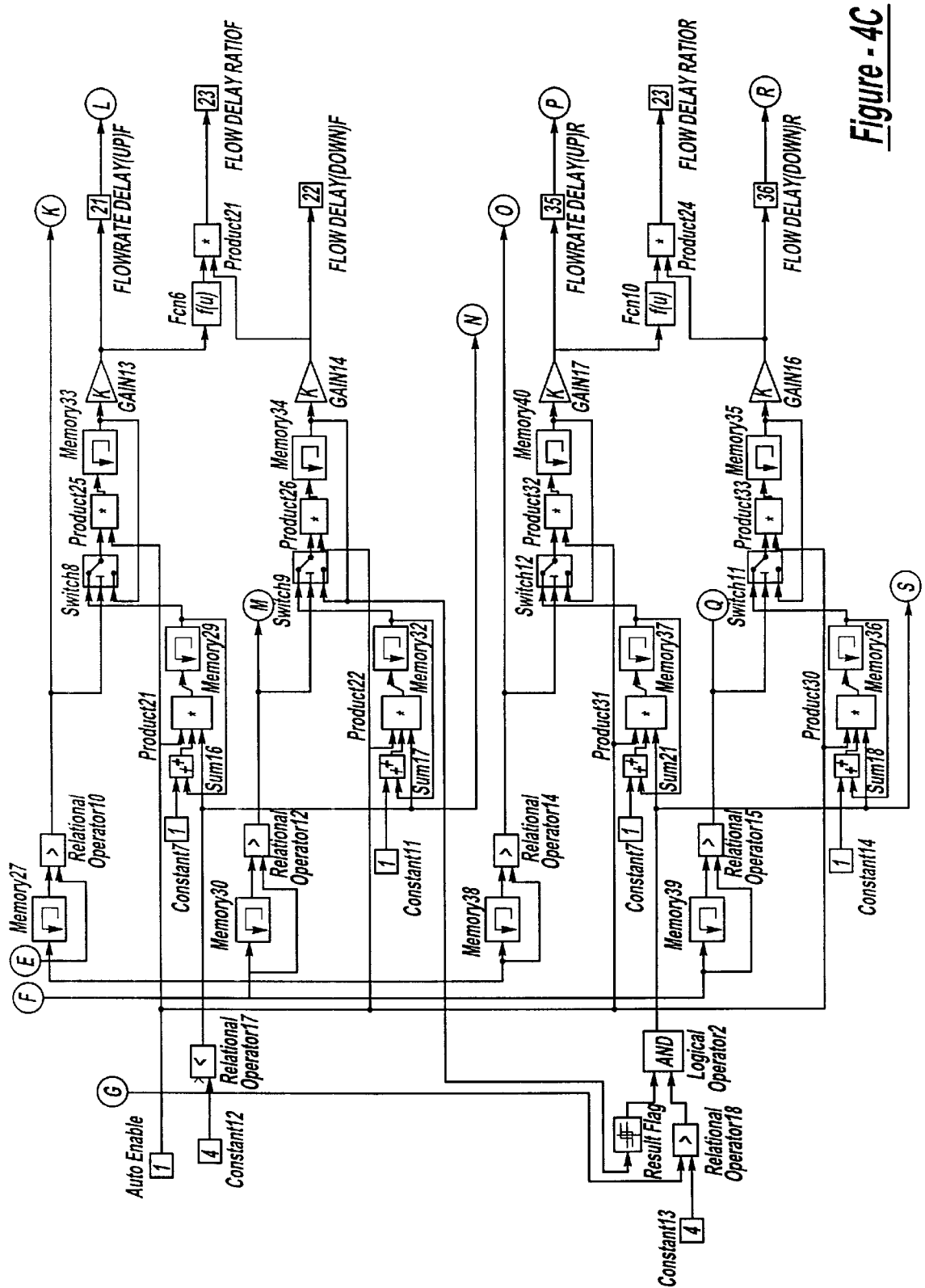
Figure 4D:
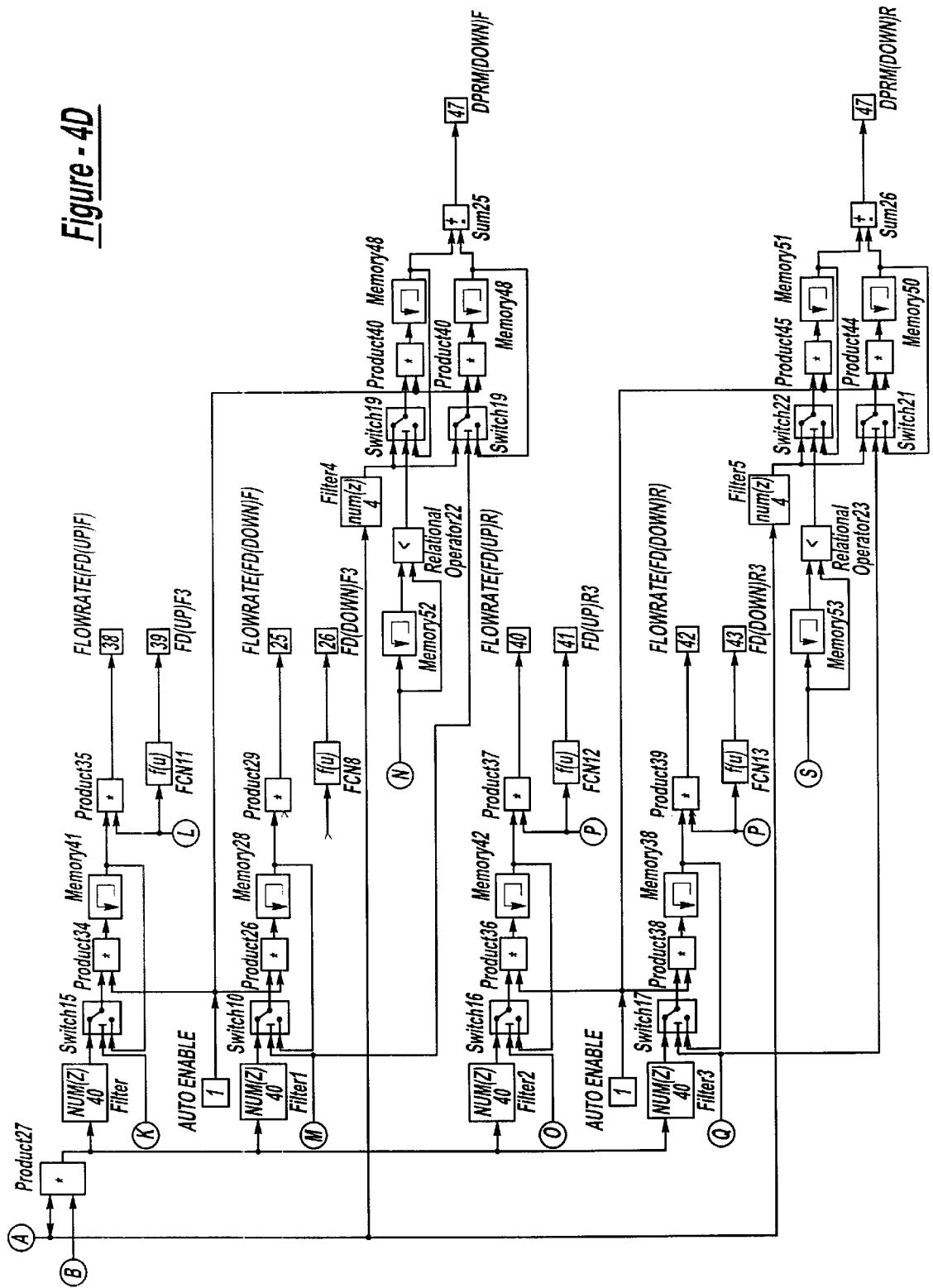

FIGS. 3A–3C are flowcharts showing a detailed implementation of catalyst monitor 20 in accordance with the present invention. Start block 100 signifies the beginning of the catalyst monitoring process. In order to achieve reliable and consistent results, catalyst monitoring should be performed under known vehicle operating conditions. In this way, catalyst monitoring is performed under preferred testing conditions. It is envisioned that the present invention may be integrated with an existing means for triggering catalyst monitoring.

Generally, an enablement subroutine will evaluate whether numerous predefined operating conditions have been met prior to initiating the monitoring process. As will be apparent to one skilled in the art, various enablement conditions (i.e., minimum engine temperature) may be required before catalyst monitoring is appropriate, and thus can be incorporated into an enablement subroutine. However, a preferred implementation of enablement subroutine 110 is described in conjunction with FIG. 3B.

First, block 111 controls other vehicle systems (e.g., an exhaust gas recirculation system) that may effect engine operating conditions during catalyst monitoring. Since catalyst monitoring may be adversely affected when performed under transient operating conditions (i.e., immediately following a rapid acceleration), the vehicle should be operating at "steady state" condition prior to initiating monitoring. Decision block 112 will determine when the vehicle is operating within steady state condition. Changes in various vehicle parameters may be used to determine when a steady state operating condition has been achieved. Vehicle parameters including, but not limited to, vehicle speed, engine rotational speed, throttle position, exhaust oxygen levels or any combination thereof may be used to determine a steady state condition. For instance, a steady state condition may occur once the vehicle has operated within a predefined range of engine speeds. Once the vehicle has sustained this steady state condition for a period of time (e.g., 5 seconds), catalyst monitoring may then be appropriate. At this point, catalyst monitor should determine (for later use) a steady-state oxygen level in the exhaust gas in block 113. Until a steady state condition is achieved, catalyst monitoring is delayed.

Next, decision block 114 waits for the vehicle to enter a deceleration condition before proceeding with catalyst monitoring. Although other vehicle parameters may be used, a closed throttle is usually indicative of a deceleration condition. During deceleration, many vehicles will automatically shut off fuel injectors as a means of increasing vehicle fuel economy. Therefore, the present invention preferably initiates catalyst monitoring in conjunction with a deceleration condition. To reduce undesirable drivability movements, fuel flow to the engine may be gradually ramped down during the deceleration condition. Preferably, catalyst monitoring of the present invention completely terminates fuel flow to the engine for the duration of the monitoring process, thereby achieving a step function in fuel flow.

Lastly, a predetermined engine rotational speed (e.g., 1500 RPM) will serve as the trigger point for initiating catalyst monitoring. As fuel flow is shut off from the engine, engine rotational speed will decrease. When decision block 116 detects the appropriate rotational engine speed, catalyst monitoring is initiated. Again, to ensure better results, the monitoring process is not triggered until the predetermined engine speed has been reached. It is also envisioned that a predetermined manifold absolute pressure may also serve (in conjunction with engine rotational speed) as the trigger point.

Once enabled, catalyst monitoring can proceed as shown in FIG. 3A. Decision block 122 detects which cylinder is firing in the vehicle's engine. Due to different manifold lengths from each of the cylinders to the exhaust system (which contains oxygen sensor 12), fuel shut off should always occur at the same time in an engine's combustion cycle. Catalyst monitoring of the present invention will preferably shut off fuel flow just after combustion in the same predetermined cylinder (e.g., cylinder #1). In this way, switching time (Tf) can be more accurately determined from test to test. Until decision block 122 detects the appropriate cylinder, catalyst monitoring is again delayed. In conjunction with other engine control modules, catalyst monitor 20 shuts off fuel to the engine in block 124. To calculate switching time (Tf), a timer mechanism is also simultaneously initiated with fuel flow termination.

Anticipating a corresponding step response change in the catalysts, decision block 126 begins monitoring the falling edge response of exhaust oxygen levels. When exhaust oxygen sensor levels reach a predefined percentage (e.g., 90%) below its steady-state value, block 128 calculates the switching time (Tf). In other words, the switching time is defined from the point of fuel flow termination until the falling edge response of exhaust oxygen sensor levels reach a predefined percentage of this steady-state value. To ensure an accurate detection of this step response change, this predefined percentage of the baseline value should be established substantially above any noise levels that may be carried in the electrical signal from the oxygen sensor.

Referring to FIG. 3C, the switching time (Tf) value is compensated based on the exhaust flowrate in block 130. Even though catalyst monitoring has been enabled during known vehicle operating conditions, the vehicle's driver may brake or otherwise alter operating conditions that can impact exhaust flowrate. Exhaust flowrate is determined by combining an engine rotational speed and manifold absolute pressure. A low pass filter is used to average the flowrate signal over the switching time period. In addition, this filter will also attenuate any noise being carried in the signal. Switching time (Tf) can then be compensated with respect to the average exhaust flowrate during this switching time period. Engine rotational speed and manifold absolute pressure are preferably used to determine exhaust flowrate, although other engine parameters (i.e., coolant temperature) effecting exhaust flowrate may be incorporated into flowrate compensation. Another means for determining exhaust flowrate is to measure the time from fuel shut off until an upstream oxygen sensor (before the catalytic converter) detects a step response change in exhaust oxygen sensor levels. This measured time is indicative of exhaust flowrate and may also be used to compensate switching time (Tf).

It is also envisioned that the flowrate compensated signal may be undergo some additional signal processing in block 131 to filter the flowrate compensated signal and thus improve signal separation. In particular, nonlinear signal processing consists of filters and/or functions which enhance the signal to noise ratio of the signal. Preferably, nonlinear signal processing comprises multiplying the flowrate compensated signal by itself (e.g., squaring the signal). Scaling of the signal may also be performed on the flowrate compensated signal.

Through the use of an empirically derived lookup table, block 132 may optionally translate the algorithm output into a catalyst efficiency value. Regardless, in block 133 the algorithm output is compared to predetermined thresholds to evaluate catalyst efficiency. Typically, the algorithm output is evaluated in compliance with government regulated on-board diagnostic procedures in block 134. Furthermore, algorithm output may also be used to illuminate a malfunction indicator light (MIL) positioned within view of the vehicle's driver. When catalyst efficiency fails predefined government requirements, decision block 136 sends an electrical signal to illuminate the MIL in block 138; but in either case catalyst monitoring is then completed in block 140.

In addition to monitoring the falling edge of the downstream exhaust oxygen sensor levels, catalyst monitor 20 may optionally measure the switching time (Tr) of the rising edge of the downstream exhaust oxygen sensor levels when fuel flow returns to the engine. Decision block 140 determines an appropriate cylinder before initiating fuel flow and thus block 142 restores fuel flow to the vehicle's engine at the same time in an engine's combustion cycle. This controlled "step like" initiation of fuel flow into the vehicle's engine will in turn cause a "rising" step response change in the exhaust oxygen sensor level. In this case, the amount of oxygen abruptly decreases in the exhaust gas as the vehicle returns to normal operating conditions. Catalyst monitor will detect this change in the exhaust oxygen sensor level, calculate a rising edge switching time, and then compute catalyst efficiency value in blocks 144–150 in much the same way as previously described in relation to block 126–132. To translate the algorithm output into a catalyst efficiency value, a second lookup table must be derived for the rising edge scenario. As a result of this additional processing, catalyst monitoring of the present invention captures two measurements of catalyst efficiency during a single test.

Figure 5:
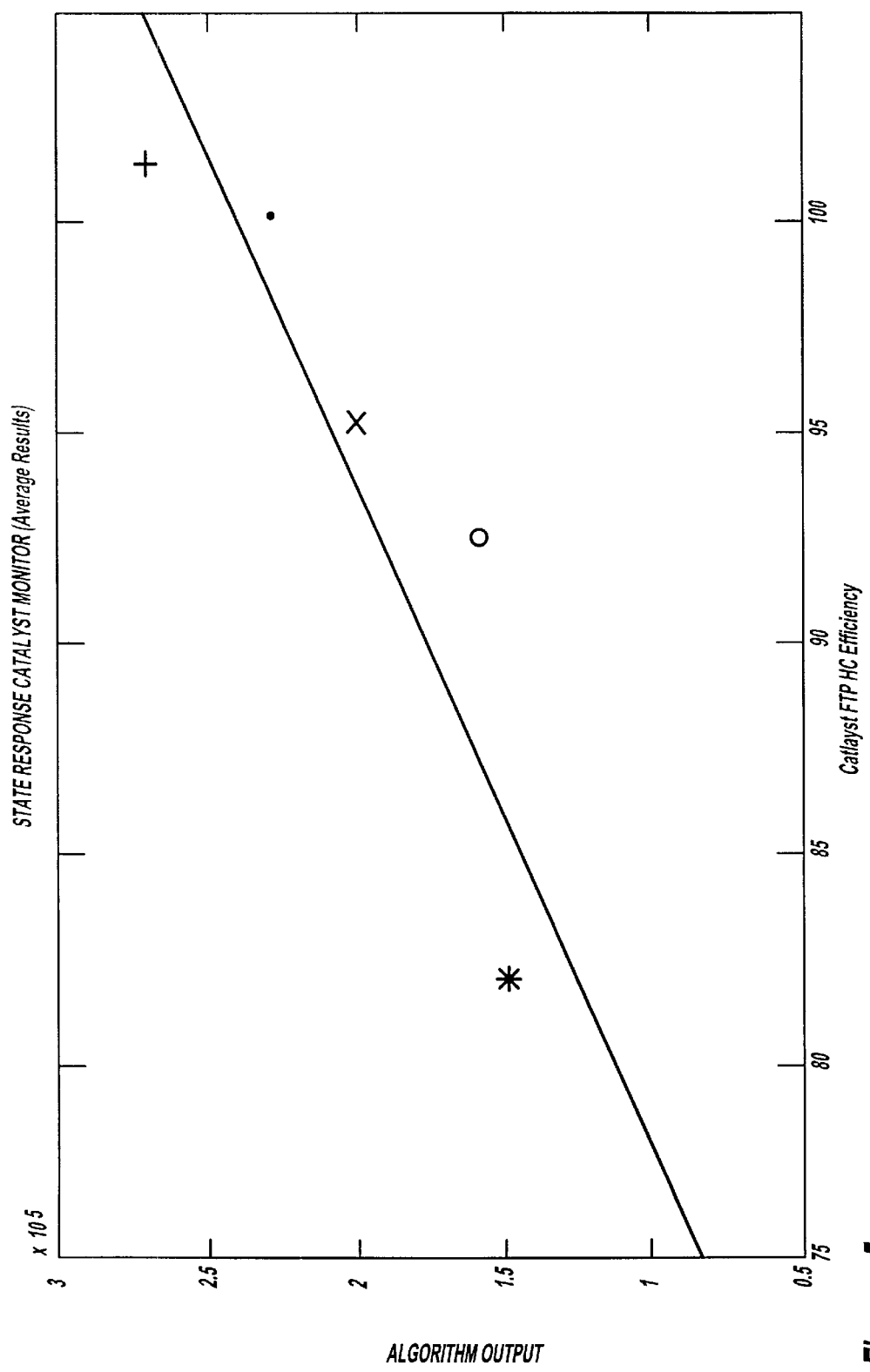
FIG. 5 is a diagram illustrating the linear relationship between algorithm output and catalyst efficiency as determined by the catalyst monitor of present invention.
Figure 6A:
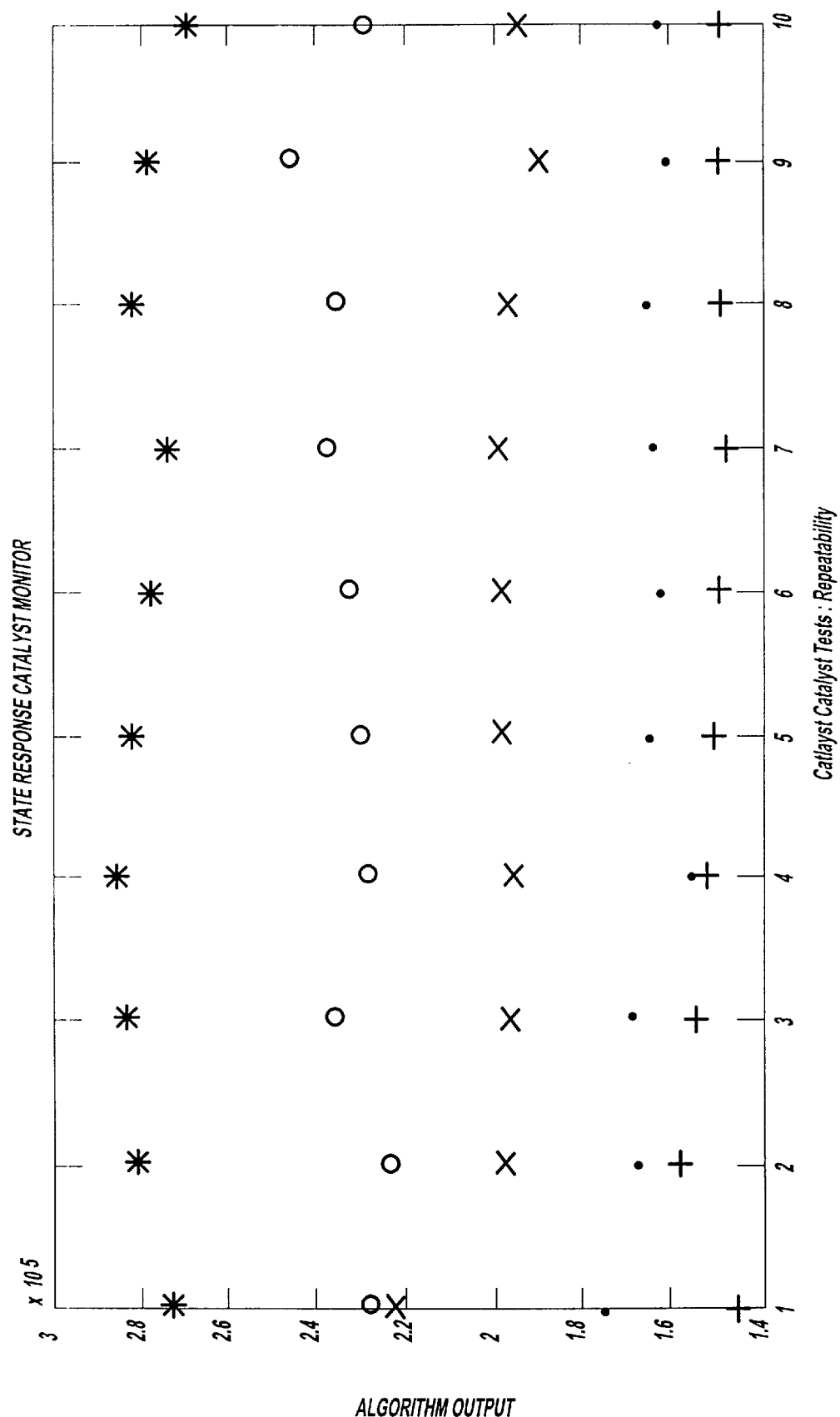
FIGS. 6A and 6B are diagrams illustrating the repeatability falling edge measurements and rising edge measurements for catalyst efficiency using the catalyst monitor of the present invention.
Figure 6B:
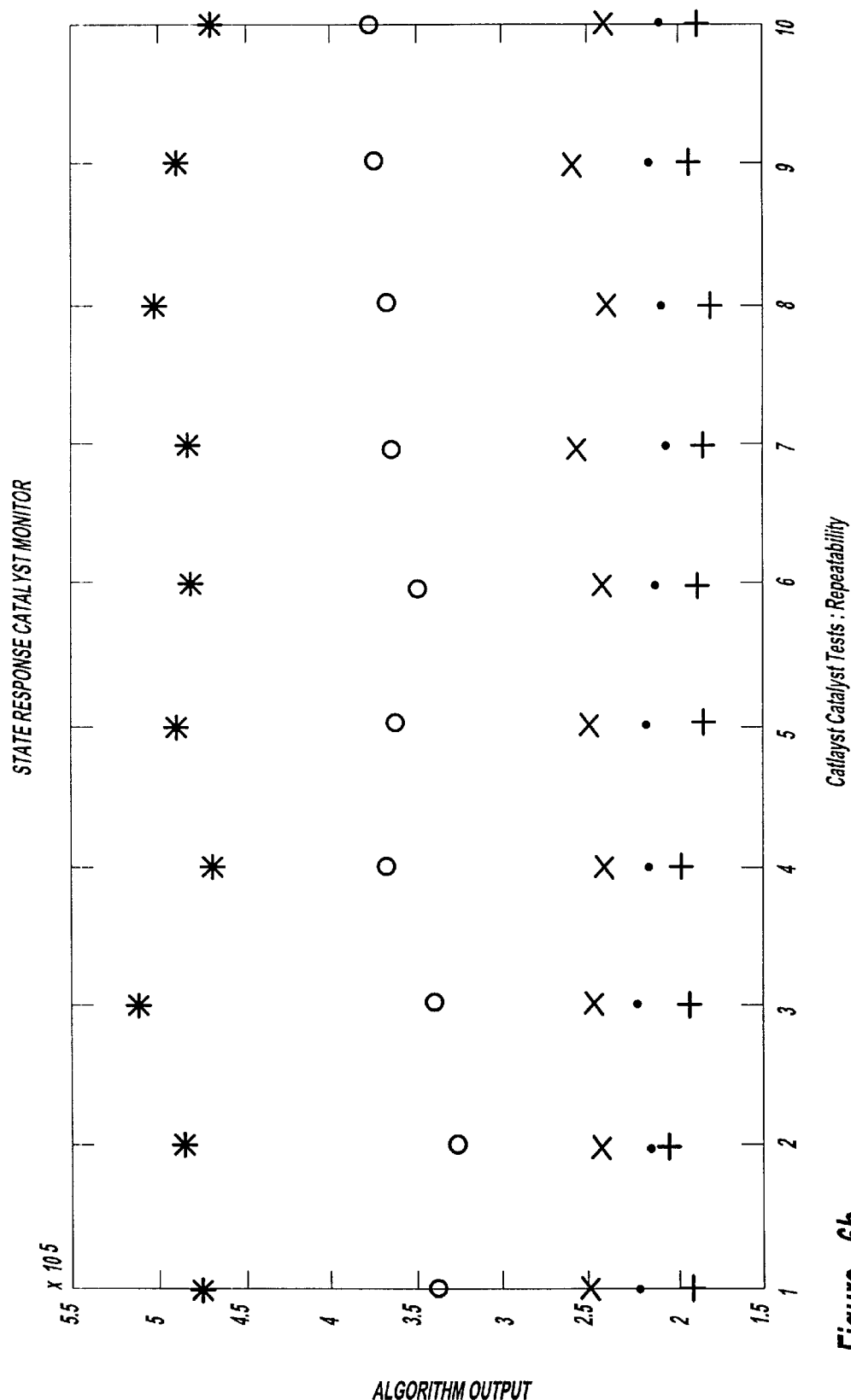

As depicted in FIGS. 4A–4D, catalyst monitor 20 of the present invention has been realized in Simulink/Matlab software running on a rapid prototyping controller. Using this implementation, real-time testing was performed on a standard test vehicle having a 2.0 liter, inline 4 cylinder internal combustion engine. This testing employed a standard 3-way catalyst and was conducted as prescribed by Federal government test procedures (i.e., FTP). Using five catalysts each with different efficiencies, the present invention produced a linear relationship between these catalysts and the corresponding algorithm output as shown in FIG. 5. Although FIG. 5 shows HC catalyst efficiency, the method of the present invention is also applicable for monitoring CO and/or $NO_x$ catalyst efficiencies. To demonstrate repeatability of the output from catalyst monitor 20, ten (10) consecutive tests were performed for each catalyst, the output of which was plotted for both the falling edge measurements and rising edge measurements in FIGS. 6A and 6B, respectively.

While the above description constitutes the preferred embodiment of the invention, it will be appreciated that the invention is susceptible to modification, variation, and change without departing from the proper scope or fair meaning of the accompanying claims.

We claim:

1. A method of monitoring catalyst efficiency in a catalytic converter of a motor vehicle, having an internal combustion engine, comprising the steps of:

detecting an oxygen level of an exhaust gas from the vehicle engine;

terminating fuel flow to the vehicle engine;

detecting a change in said oxygen level;

determining a time period between termination of fuel flow into the vehicle engine and detection of said change in said oxygen level; and compensating said time period with respect to an exhaust flowrate during said time period, such that the compensated time period being indicative of catalyst efficiency of the catalytic converter.

2. The method of claim 1 wherein said exhaust flowrate being determined from a manifold absolute pressure and an engine rotational speed of the engine during said time period.

3. The method of claim 1 further comprising the step of squaring said compensated time period to improve signal to noise separation.

4. The method of claim 1 wherein the step of detecting an oxygen level further comprises using an oxygen sensor positioned at the outlet of the catalytic converter.

5. The method of claim 1 further comprises the step of determining at least one vehicle operating condition such that said vehicle operating condition maintains a steady value prior to the step of detecting an oxygen level.

6. The method of claim 1 further comprises the step of detecting a deceleration condition prior to the step of terminating fuel flow.

7. The method of claim 1 further comprises the step of terminating fuel flow further comprises being initiated when engine rotational speed reaches a predetermined value.

8. The method of claim 1 wherein the step of terminating fuel flow further comprises an engine control module, said engine control module for at least controlling an engine fuel system.

9. The method of claim 1 wherein the engine includes at least two cylinders such that the step of terminating fuel flow occurs after combustion in a predetermined cylinder.

10. The method of claim 1 further comprises the step of translating the compensated time period into a catalyst efficiency value using empirical data.

11. The method of claim 1 further comprises the steps of:

initiating fuel flow into the vehicle engine;

detecting a second change in said oxygen level;

determining a second time period between initiation of fuel flow into the vehicle engine and detection of said change in said oxygen level; and compensating said second time period with respect to a second exhaust flowrate, such that the compensated second time period linearly correlates to catalyst efficiency of the catalytic converter.

12. A method of monitoring catalyst efficiency in a catalytic converter of a motor vehicle, having an internal combustion engine, comprising the steps of:

detecting an oxygen level of an exhaust gas from the vehicle engine by using an oxygen sensor positioned at the outlet of the catalytic converter;

terminating fuel flow to the vehicle engine;

detecting a change in said oxygen level using said oxygen sensor in response to terminating fuel flow;

determining a time period from termination of fuel flow into the vehicle engine to detection of said change in said oxygen level;

compensating said time period with respect to an exhaust flowrate, said exhaust flowrate being determined from a manifold absolute pressure and an engine rotational speed of the engine during said time period; and squaring said compensated time period to improve signal to noise separation, such that the compensated time period being indicative of catalyst efficiency of the catalytic converter.

13. The method of claim 12 further comprises controlling at least one vehicle system that effects engine operating conditions prior to the step of detecting an oxygen level.

14. The method of claim 12 further comprises the step of determining at least one vehicle operating condition such that said vehicle operating condition maintains a steady value prior to the step of detecting an oxygen level.

15. The method of claim 14 wherein said vehicle operating conditions being at least one of vehicle speed, change in vehicle speed, engine rotational speed, and throttle position.

16. The method of claim 12 wherein said change in said oxygen level being defined as a predetermined amount of said oxygen level substantially above the signal noise associated with said oxygen sensor.

17. The method of claim 12 further comprises the step of detecting a deceleration condition prior to the step of terminating fuel flow, said deceleration condition being indicative of a decrease in fuel flow to the vehicle engine.

18. The method of claim 12 wherein the vehicle engine having at least two cylinders such that the step of terminating fuel flow occurs after combustion in a predetermined cylinder.

19. The method of claim 12 further comprises the steps of:

initiating fuel flow into the vehicle engine;

detecting a second change in said oxygen level;

determining a second time period between initiation of fuel flow into the vehicle engine and detection of said change in said oxygen level; and compensating said second time period with respect to a second exhaust flowrate, such that the compensated second time period linearly correlates to catalyst efficiency of the catalytic converter.

* * * * *